United States Patent [19]
O'Brien

[11] 3,789,273
[45] Jan. 29, 1974

[54] LATCH MECHANISM FOR MEMORY DISC CARTRIDGE

[75] Inventor: Terence J. O'Brien, San Jose, Calif.
[73] Assignee: Caelas Memories, Inc., San Jose, Calif.

[22] Filed: Sept. 11, 1972
[21] Appl. No.: 288,062

[52] U.S. Cl. .................. 317/141 R, 292/50, 292/64, 340/174.1 C
[51] Int. Cl. .................. G11b 23/04
[58] Field of Search 346/137; 340/174.1 R, 174.1 C; 179/100.2 Z; 292/6, 50, 64; 200/61.58, 61.62, 61.81; 317/141 R

[56] References Cited

UNITED STATES PATENTS 3,593,327 7/1971 Shill .................. 340/174.1 C
3,643,240 2/1972 Raiser .................. 340/174.1 C

FOREIGN PATENTS OR APPLICATIONS 760,914 3/1934 France .................. 292/50

*Primary Examiner*—William M. Shoop, Jr.
*Assistant Examiner*—Harry E. Moose, Jr.
*Attorney, Agent, or Firm*—Lindenberg, Freilich & Wasserman

[57] ABSTRACT

A disc drive with a cover hold-down mechanism for preventing energization of the drive motor unless the cover of the disc pack is installed properly. The hold-down mechanism includes a pair of brackets pivotally mounted about vertical axes and a pair of arms pivotally mounted about horizontal axes on the brackets. After a disc pack cover is installed, the brackets are pivoted to move the arms over the cover, and the arms pivot upwardly over a beveled periphery of the cover. A switch prevents energization of the drive motor if the arms are not raised. The arms will not be raised if no cover is installed or if the cover is too high for the arms to rise over the beveled cover surface, and in either case, the motor will not be energized. A mechanism for preventing removal of the cover until the motor has come to a full stop, includes a time delay circuit that releases the hold-down mechanism after a predetermined period which is slightly greater than the time required for the motor to coast to a stop.

7 Claims, 7 Drawing Figures

LATCH MECHANISM FOR MEMORY DISC CARTRIDGE

BACKGROUND OF THE INVENTION

This invention relates to memory disc drives that utilize replaceable disc pack assemblies.

Top loading disc drives utilized memory discs that are protected by covers. In many disc drives, the covers must be placed over the disc pack assembly when it is installed in the drive machine to protect the memory disc from dust. Latches are utilized to hold down the disc cover, and generally two latches are utilized on opposite sides of the cover. It is important to not only hold down the cover, but to make sure that the cover is installed properly and to make sure that the cover is, in fact, installed, It is also desirable to prevent removal of the cover until the memory disc has come to a complete stop, which may be a considerable period after power is removed since the motor and disc rotate at high speed, utilize low friction bearings, and have a high combined moment of inertia.

SUMMARY OF THE INVENTION

In accordance with one embodiment of the present invention, a cover hold-down mechanism of simple design is provided which prevents energization of the drive motor unless the disc pack cover is properly installed, and which prevents release of the cover after the motor is de-energized until the motor shaft has come to a complete stop. The mechanism includes a pair of brackets or arm supports located on opposite sides of the cover position and pivotally mounted about vertical axes on the disc drive frame. An arm is pivotally mounted on each supporting member about a substantially horizontal axis so its outer end can be raised over the top of a cover when the arm supporting member moves the arm over a cover. The cover has a top surface which is beveled along its periphery, so that as the arm is moved over it, the arm is pivoted up. A switch senses upward pivoting of the arm to permit energization of the motor. If the cover is installed improperly and therefore at too great a height, the arm will abut the vertical sides of the cover and will not be raised. Also, if the cover is not installed, the arm will move over the cover position but will not be raised. Thus, if the cover is installed improperly or is not installed at all, the arm will not pivot up and the motor will not be energized. The pair of arms supports on opposite sides of the cover are connected together by a flexible cable that moves them simultaneously.

A solenoid is positioned in the path of a handle that projects from one arm support to prevent release of the cover until the memory disc and motor shaft have come to a complete stop. The solenoid is energized by a time-delay circuit which operates at a time delayed from the instant of motor de-energization by slightly greater than the period required for the motor to coast to a complete stop. This eliminates the need for a tachometer to sense motor rotation.

The novel features that are considered characteristic of this invention are set forth with particularlity in the appended claims. The invention will best be understood from the following description when read in connection with the accompanying drawings.

DESCRIPTION OF THE PREFERRED EMBODIMENTS

Figure 1:
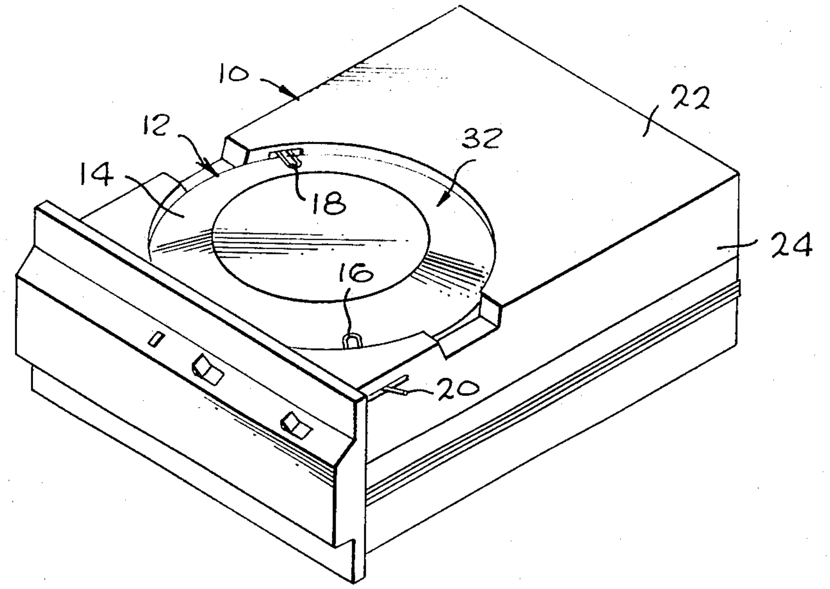
FIG. 1 is a front and right side perspective view of the disc drive and disc pack assembly of the invention.

FIG. 1 illustrates a disc drive 10 with a disc pack assembly 12 installed thereon and with the cover 14 of the assembly held in place by a pair of arms 16, 18 of a hold-down apparatus of the invention. The hold-down apparatus includes a handle 20 that can be pulled towards the front of the drive to move the arms 16, 18 so they release the cover 14 and permit removal of the disc pack assembly. The disc drive 10 includes a covering 22 that is mounted over a rigid frame 24 and that largely conceals the hold-down apparatus.

Figure 2:
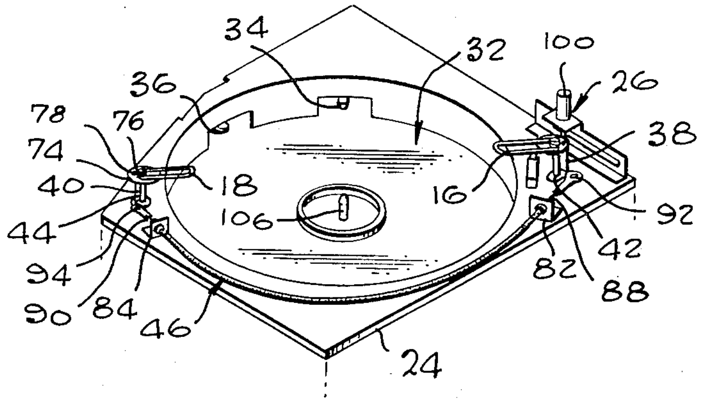
FIG. 2 is a partial front and left side perspective view of the drive of FIG. 1, with a covering thereof removed.
Figure 6:
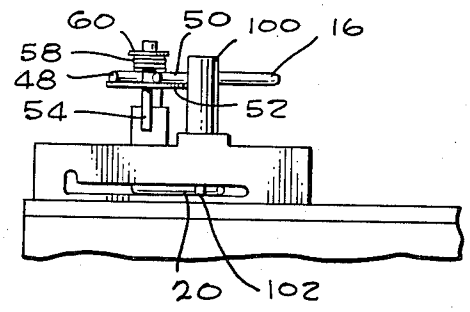
FIG. 6 is a view taken on the line 6—6 of FIG. 5.

FIG. 2 illustrates details of the hold-down apparatus 26 which is mounted on the frame 24 of the disc drive. The arms 16, 18 of the hold-down apparatus are located on opposite sides of the region 32 where the disc pack assembly is received. The frame has a recess at the receiving region 32 into which the one or more memory discs of the disc pack assembly are received and into which brushes 34 and read/write heads 36 of the drive are moved. The cover of the disc pack assembly is installed over the depression and should be securely held down on the frame 24 to protect the memory disc from dust. The arms 16, 18 aree pivotally mounted on arm supports or movers 38, 40 which, in turn, are pivotally mounted on posts 42, 44 that are fixed to the frame 24 at opposite sides of the receiving region 32. A flexible cable 46 connects the two arm movers 38, 40 to simultaneously pivot both arm movers and the arms mounted on them. The manually moved handle 20 is fixed to one of the arm movers 38 to permit manual operation of the arm movers.

Referring also to FIGS. 3—6, it can be seen that the arm 16 is U-shaped, ith a pair of inner ends 48,50 welded or otherwise fixed to a large washer 52. The washer 52 is loosely held on the post 42 so it can pivot about a vertical axis thereon and also can wobble or pivot to a limited degree about a horizontal axis. A pin 54 fixed to the arm mover 38 extends upwardly through a hole 56 in the washer 52. Accordingly, when the arm mover 38 pivots about a vertical axis, it forces the arm 16 to also pivot with it, although the hole 56 in the washer is large enough to also permit wobbling of the washer. A coil spring 58 extends about the top of the post and has an upper end bearing against a retainer 60 fixed to the post and a bottom end bearing against the washer 52. The spring 58 is preloaded so that it constantly urges the washer down against another washer 62 that lies at the top of the arm mover 38. The downward force of the spring on the washer 52 urges the washer towards a substantially horizontal position flush against the supporting washer 62 under it. Accordingly, the arm 16 is urged to extend horizontally, but it can pivot so that its outer end 64 lifts up.

Figures 4, 5:
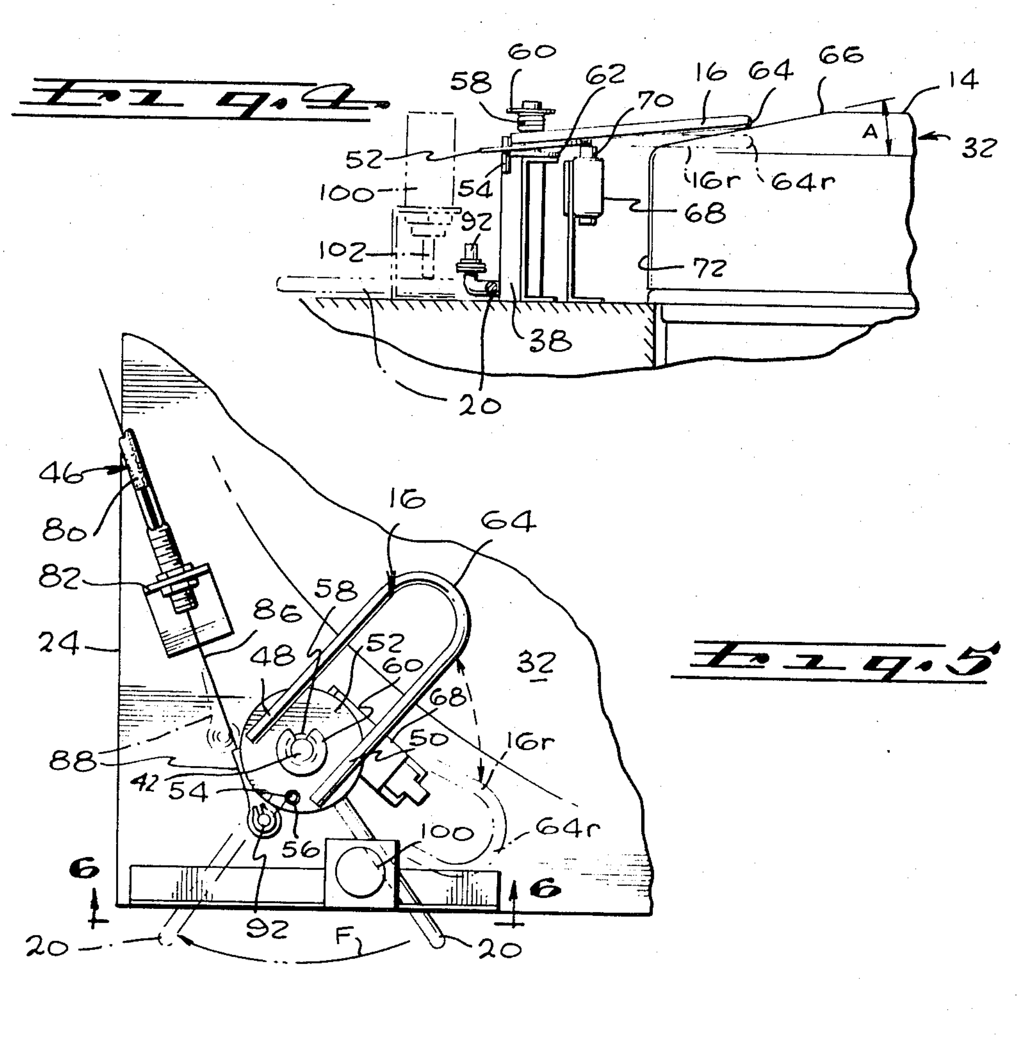
FIG. 4 is a partial view taken on the line 4—4 of FIG. 3.
FIG. 5 is a plan view of a portion of the mechanism of FIG. 3.

As best shown in FIG. 4, the cover 14 of the disc pack assembly has an upper surface which is beveled along its periphery 66 at a small bevel angle A of much less than 45°. When the disc pack assembly is installed, the arm mover 38 holds the arm 16 at a position 16*r* indicated in phantom lines in FIGS. 4 and 5, wherein the arm lies beside the receiving portion 32 where the cover is received. At this position 16*r* of the arm, the arm extends horizontally and its outer end lies just above the bottom of the beveled periphery 66 of the cover when the cover is correctly installed. After the cover 14 is installed, the operating handle 20 can be moved to pivot the arm mover 38 so that the arm 16 is moved over the pack-receiving region 32 of the frame. As the arm 16 is pivoted, its outer end 64 encounters the beveled region 66 of the cover and rides up along it so that the outer end portion 64 of the arm is lifted. A micro-switch 68 which is fixed to the machine frame has a button 70 that lies beneath the washer 52 on which the arm 16 is fixed. When the arm 16 is lifted, the region of the washer 52 that lies over thee micro-switch button 70 is also lifted and the normally open micro-switch is closed. Closing of the micro-switch permits the motor of the disc drive to be energized.

The arm 16 is mounted so that the micro-switch 68 will not be operated if the cover 14 is not installed or if the cover is not installed properly. If the cover 14 is not installed, the arm 16 will still be able to pivot over the pack-receiving region 32. However, with no beveled cover region to lift the arm, the arm will remain horizontal under the force of the spring 58 on the washer 52, and the micro-switch 68 will not be operated. If the cover 14 is installed improperly, one side of the cover will be higher than the other. If the side of the cover 14 nearest the arm 16 is too high, then the outer end 64 of the arm will initially hit the vertical side wall 72 of the cover rather than the beveled surface 66 of the top. If the arm hits the vertical side 72 of the cover, the cover will prevent the arm 16 from pivoting any further over the pack-receiving region 32, and therefore the arm 16 will not be raised, the micro-switch 68 will not be operated, and the motor of the drive will not be energized. If the cover 14 is installed improperly, but with the side of the cover nearest the arm 16 slightly too low, the arm 16 will be in a position where it could ride over the cover and be lifted by it. However, this will mean that the other side of the cover which is nearest the other arm 18, will lie too high with respect to the machine frame. The other arm 18 is mounted similarly to the arm 16, so that if the cover is too high near the arm 18, the arm 18 will abut the vertical side wall 72 of the cover thereat and cannot pivot over the cover. The cable 46 that connects the arm moving members 38, 44 causes them to move simultaneously, and will prevent the arm 16 from being moved over the cover and therefore prevent it from being raised. Thus, the mechanism utilizes only a single micro-switch 68 to sense both the presence of a cover and the proper installation of a cover.

As mentioned above, the arm 18 is mounted in a manner similar to the arm 16. The arm 18 is fixed to a washer 74 which is urged downwardly and towards a level position by a spring 76 and which is coupled by a pin 78 to the arm mover 40, all in a manner similar to the mechanism at the arm 16. The flexible cable 46 has a sheath 80 whose opposite ends are fixed to brackets 82, 84 that are fixed to the frame 24. A flexible wire 86 that extends through the sheath has opposite ends at 88, 90 coupled to projections 92, 94 that are fixed to respective arm movers 38, 40. One of the projections 92 is formed by one end of the handle 20 that is fixed to the arm mover 38. The use of a flexible cable 46 to connect the two arm movers 38, 40 together is uniquely advantageous in the disc drive of this invention, inasmuch as it provides a simple coupling that can extend around the pack-receiving region 32.

A disc pack assembly can be removed from the drive by de-energizing the motor, moving the handle 20 rearwardly to release the cover 14 from the arms 16, 18 and then lifting up the cover and memory disc. Damage could occur if the cover and memory disc were lifted while the memory disc was still rotating. Accordingly, it is important to provide a mechanism that prevents lifting of the cover until the motor spindle and memory disc have come to a stop. It may require a considerable time, such as 30 seconds or more, for this to occur. It is possible to utilize a tachometer or other device that senses motor or disc rotation to prevent access to the disc pack assembly or prevent release of the cover, but the cost of a tachometer is appreciable and it adds another element which can break down.

Rotation of the arms 16, 18 away from a cover-holding position can be prevented by a solenoid 100 mounted on the frame, whose armature 102 can move downwardly into the path of the solenoid-engageable member or handle 20. When the solenoid 100 is de-energized, which occurs when the motor of the drive is energized, its armature 102 drops down and the handle 20 cannot be moved in the forward direction indicated by arrow F in FIG. 5. After the motor stops rotating, the solenoid 100 is automatically energized so its armature is lifted, the handle 20 can be moved forwardly to move the arms 16, 18 away from the cover, and the cover and disc pack can be lifted off the disc drive machine.

Figure 7:
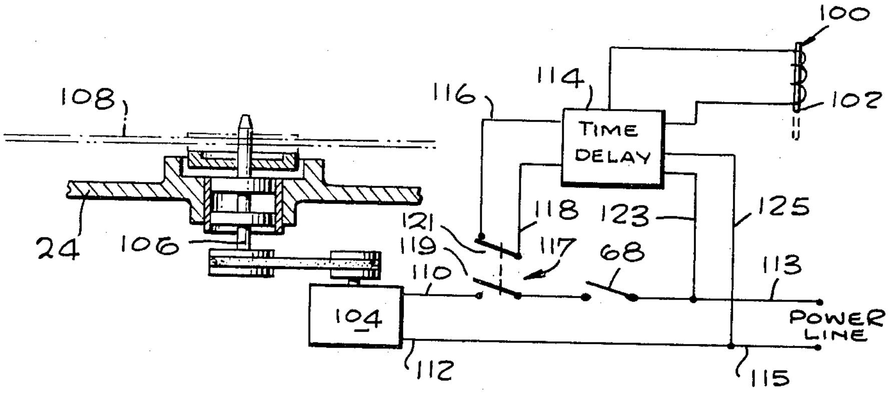
FIG. 7 is a simplified partially schematic view of the apparatus of FIG. 1.
Figure 3:
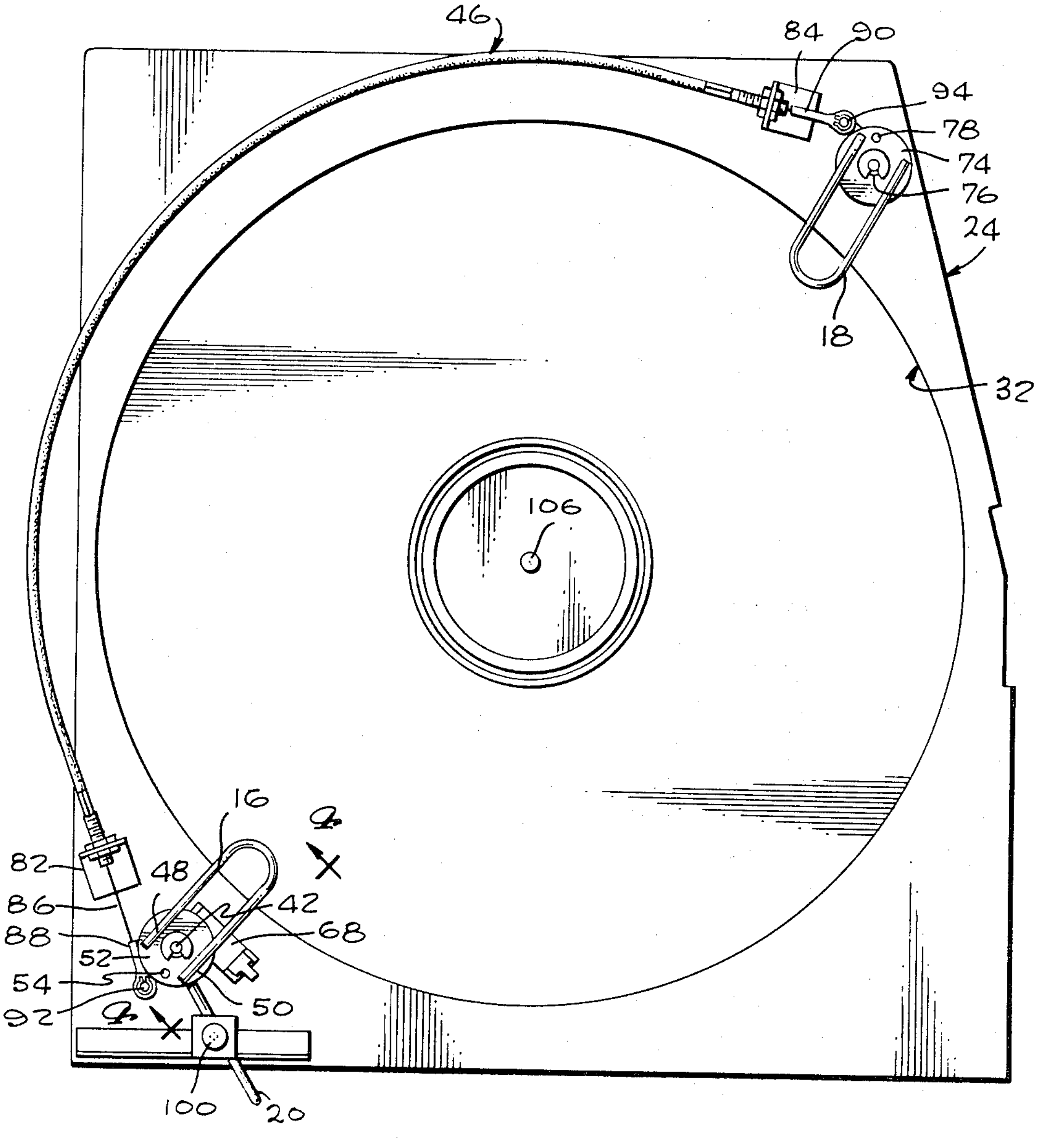
FIG. 3 is a plan view of the apparatus of FIG. 2, shown in a holding position.

The mechanism for energizing the solenoid 100 does not directly sense rotation of the motor, but instead counts a predetermined delay period which is long enough for the motor to coast to a stop. FIG. 7 is a simplified illustration of the circuitry that controls motor operation. The drive includes a motor 104 which drives a spindle 106 that drives a memory disc 108 of the disc pack assembly. The motor is energized by currents delivered to a pair of motor input terminals 110, 112, that are connected through the micro-switch 68 to power lines 113, 115. Additional switches (not shown) are utilized to control motor energization. The solenoid 100 which prevents release of the pack assembly cover is energized by a time delay circuit 114. A double pole motor switch 117 has two switch portions that are operated simultaneously, including a motor portion 119 that controls current to the motor and a time delay portion 121 that controls current to the time delay circuit through leads 116, 118. The time delay circuit and solenoid are energized through a pair of conductors 123, 125 that are connected to the power line. At a predetermined period after de-energization of the motor by reason of opening the switch 118, the time delay circuit 114 passes a current through the solenoid 100 to energize it and thereby permit release of the cover. A variety of simple time delay circuits are known which can be used at 114, such as those which utilize a capacitor that discharges through a resistor to trip a switch. The fact that the time delay circuit 114 that energizes the solenoid 100 is powered from the power line means that the solenoid operates only if the machine continues to be connected to a power line after the motor switch is opened. It would bee possible to construct the machine so that a solenoid were de-energized (instead of energized) a predetermined time after the motor was de-energized, to release the arm-operated handle 20. However, if the motor were de-energized by reason of disconnection of the entire machine from the power line, then the solenoid might be de-energized at the same time instead of after the required delay period.

Thus, the invention provides a simple mechanism for securely holding down the cover of a disc pack assembly and for preventing energization of the disc drive motor unless the cover is installed and is installed properly. The mechanism includes a cover-engaging member, such as the arm 16, which is mounted to move over and away from the position of the cover and which can also be lifted by the cover. This mechanism is utilized in conjunction with a disc pack assembly having a cover which is beveled at the periphery of the top, so that the arm or other member is automatically lifted as it rides up along the beveled surface. A switch that is operated by upward movement of the arm controls energization of the motor. The disc drive includes two arms mounted at opposite sides of the region where the disc pack assembly is received and a flexible cable connects the arm moving mechanisms to move them simultaneously. Release of the arms from the cover is prevented by a solenoid that operates only after the rotating apparatus has coasted to a complete stop. The solenoid is operated by a delay circuit which operates it only after a predetermined time which is slightly greater than the time required for the motor to coast to a complete stop when it rotates with the memory disc. This delay period is of the same order of magnitude as the time required for the motor to coast to a complete stop, so that there is only a short additional time between stopping of the motor and operation of the solenoid.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A disc drive for use with a replaceable disc pack assembly that includes at least one memory disc and a cover of a predetermined height at the periphery of its top comprising:

a disc drive frame including a pack-receiving region for receiving a disc pack assembly with the top of the cover thereof extending largely horizontal;

means for driving the memory disc of the disc assembly;

means for sensing the proper mounting of the disc pack assembly at said pack-receiving region including a hold-down arm and means for moving said arm substantially horizontally between a first position spaced from the cover of the disc pack assembly and a second position over the cover, said moving means maintaining the arm at a height lower than the top of the cover periphery when the arm is in said first position and said arm moveable upwardly so it can be raised by the cover to a position over the cover when the arm moves to the second position; and means responsive to raising of said arm for controlling said driving means to prevent rotation of the memory disc of the assembly if the arm is not raised.

2. The disc drive described in claim 1 wherein:

said arm moving means includes an arm mover pivotally mounted about a primarily vertical axis on said frame, said arm being mounted to pivot with said arm mover about said primarily vertical axis and also to pivot about a primarily horizontal axis, and said arm moving means includes a spring urging said arm towards a predetermined level wherein said arm will engage a properly installed cover neat its top.

3. The disc drive described in claim 1 including:

a solenoid mounted on said frame and operable between a first condition wherein it prevents pivoting of said arm from said second position to said first position and a second condition wherein it permits said pivoting; and time delay means responsive to operation of said driving means for operating said solenoid at a time delayed by a predetermined period after said driving means begins to decelerate, said time period being of the order of magnitude as the period between the beginning of deceleration of said driving means and the time at which said driving means coasts to a complete stop.

4. The disc drive described in claim 1 including:

a second raiseable hold-down arm mounted at a location on a side of the cover position opposite the first named arm;

second means for moving the second arm between positions respectively spaced from and lying over the cover; and a flexible cable extending about the cover position and connecting said first named and second moving means, for operating them to move the arms simultaneously between positions over and away from the cover.

5. A disc drive for use with a replaceable disc pack assembly that includes at least one memory disc and a cover of predetermined height at the periphery of its top, comprising:

a disc drive frame including a pack assembly receiving region for receiving a disc pack assembly with the top of the cover thereof extending at a predetermined height on the frame;

means selectively energizable for driving the memory disc of the disc assembly;

a pair of arm-moving members pivotally mounted on the frame about substantially vertical axes at opposite sides of the pack assembly receiving region;

a pair of arms each coupled to one of said arm-moving members to be pivoted about a substantially vertical axis by it, and each arm pivotable about a substantially horizontal axis so that the arms can move over and away from the position of the pack assembly cover and the arms can lift onto the top of a cover;

spring means coupled to said arms to urge then downwardly;

a switch mounted on said frame and positioned to be operated by a first of said arms only if said first arm is raised;

means coupled to said arm-moving members to pivot them; and means coupled to said switch to permit energization of said driving means only if said switch is activated.

6. The disc drive described in claim 5 including:

a solenoid-engageable member fixed to one of said arm-moving members;

a solenoid with armature means moveable into and out of the path of said solenoid-engageable member, to respectively permit or prevent pivoting of the arm-moving member; and means for maintaining said armature means in the path of said solenoid-engageable member at least until said driving means stops.

7. The disc drive described in claim 5 including:

a cover mountable at a predetermined location on said frame and having a top surface which is beveled at its periphery, the lowermost portion of the beveled surface being at a height below the outer end of said arm and the top of said beveled surface being at a height above the outer end of said arm when the arm is in its lowest position.

* * * * *